(12) United States Patent
Toyama et al.

(10) Patent No.: US 7,080,390 B2
(45) Date of Patent: Jul. 18, 2006

(54) POWER TRANSMITTING DEVICE FOR STEPPING MOTOR AND DISK DRIVE PROVIDED WITH THE SAME

(75) Inventors: Yasunari Toyama, Osaka (JP); Makoto Kambayashi, Neyagawa (JP); Youtarou Yamauchi, Kawanishi (JP)

(73) Assignee: Matsushita Electric Industrial Co., Ltd.,, Osaka (JP)

( * ) Notice: Subject to any disclaimer, the term of this patent is extended or adjusted under 35 U.S.C. 154(b) by 481 days.

(21) Appl. No.: 10/464,628

(22) Filed: Jun. 18, 2003

(65) Prior Publication Data

US 2004/0032818 A1 Feb. 19, 2004

(30) Foreign Application Priority Data

Jun. 19, 2002 (JP) ............................. 2002-178486

(51) Int. Cl.
*G11B 7/08* (2006.01)
(52) U.S. Cl. ..................................................... 720/659
(58) Field of Classification Search ................ 720/608, 720/620, 632, 661, 675; 369/215
See application file for complete search history.

(56) References Cited

U.S. PATENT DOCUMENTS 4,829,502 A * 5/1989 Aoyagi et al. ............... 720/620
6,411,582 B1 * 6/2002 Nakatani et al. ............ 720/620
6,597,651 B1   7/2003 Kage et al.
6,757,234 B1 * 6/2004 Fujiwara ..................... 720/620

FOREIGN PATENT DOCUMENTS

CN    1300423 A    6/2001
JP    5128688      5/1993

OTHER PUBLICATIONS

Chinese Office Action corresponding to application No. 03143077.5 dated Jul. 8, 2005.

* cited by examiner

*Primary Examiner*—A. J. Heinz
*Assistant Examiner*—Mark Blouin
(74) *Attorney, Agent, or Firm*—RatnerPrestia (57) ABSTRACT

A power transmitting device for a stepping motor comprises: a stepping motor commonly serving as a power source for a pickup moving mechanism of a light load and a power source for a disk transferring mechanism of a heavy load; switching mechanism for a switching path for transmitting the power from the motor between the first path, via which the power is transmitted to the pickup moving mechanism, and a second path, via which the power is transmitted to the disk transferring mechanism via power transmitting gear mechanisms; and transmission prohibiting mechanism for prohibiting the transmission of the power from the stepping motor to the disk transferring mechanism at the beginning of the power transmission via the second path.

21 Claims, 7 Drawing Sheets

Fig.1

SIDE OF DISK INNER CIRCUMFERENCE ← → SIDE OF DISK OUTER PERIPHERY

POWER TRANSMITTING DEVICE FOR STEPPING MOTOR AND DISK DRIVE PROVIDED WITH THE SAME

BACKGROUND OF THE INVENTION

1. Field of the Invention

The present invention relates to a power transmitting device for a stepping motor and a disk drive provided with the power transmitting device.

2. Description of the Related Art

Conventionally, there has been generally known a disk drive provided with a disk transferring mechanism (i.e., a loading/ejecting mechanism) for transferring a disk between a loading position above a turn table and an ejection position outside of the device, as a disk drive for recording or reproducing an information signal in a disk serving as an information recording medium such as a so-called CD or DVD.

In the disk drive of such a type, a motor for driving the above-described disk transferring mechanism is needed in addition to a motor for turning and driving the turn table and a drive motor for performing a pickup moving operation so as to write and read a signal in a disk, and therefore, three motors in total are normally required to be mounted in the disk drive.

In contrast, for example, Japanese Patent Laid-open Publication No. 5-128688 discloses a configuration, in which one motor is configured such that its rotating force can be selectively transmitted to a side of a disk transferring mechanism or a side of a pickup moving mechanism, and the transmission of the rotating force of the motor is securely switched at a good timing, so that a disk transferring operation and a pickup moving operation are securely switched at a good timing, wherein one motor can serve as both of a drive source for the disk transferring mechanism and a drive source for the pickup moving mechanism, in order to reduce the number of motors to be used so as to reduce a cost and simplify the structure of the device. In the above-described prior art, the rotating force of the motor to the disk transferring mechanism and the pickup moving mechanism is transmitted via a gear system. The transmission of the rotating force of the motor is switched by switching the engaging state of the gear system.

The above-described pickup moving mechanism, is normally configured such that a feed screw is provided on a drive shaft extending along a pickup moving direction (i.e., the radial direction of the disk), an engaging element integral with a pickup engages with the feed screw, the feed screw is rotated by rotating the drive shaft by means of the motor, and thus, the pickup is moved along the feed screw. In the prior art, as is disclosed in, for example, the aforementioned gazette, it has been general that a so-called DC motor is used as a drive source and the drive shaft of the pickup moving mechanism is linked to the output shaft of the DC motor via a gear deceleration mechanism.

A disk drive in recent years has been required to move the pickup at a higher speed, as is represented by, for example, a disk drive applicable to a navigation system. However, in the prior art, a drive system of the pickup moving mechanism is configured such that the deceleration gear mechanism is combined with the so-called DC motor, so that there is a limit in achieving a high speed of the pickup movement.

Thus, in place of the configuration according to the prior art, it is considered to use a so-called stepping motor capable of rotating at a high speed and finely controlling the rotation is used as a drive source, and to transmit the power (i.e., the rotating force) of the stepping motor directly (in other words, without using any deceleration gear mechanism) to the drive shaft of the pickup moving mechanism.

As well known, the above-described stepping motor can finely control the rotation at a high speed, and therefore, it is remarkably suitable for the drive source for the pickup moving mechanism, in which a higher speed is required. However, in the case where a relatively heavy load is exerted at the beginning of the drive and at a very low engine speed, a step out, for example, is liable to occur. In that case, the stepping motor raises a drawback of relative difficulty in smooth and stable control.

The above-described disk transferring mechanism is adapted to basically at least drive a roller for transferring a disk or a rack for transferring a disk tray since the power of the motor serving as the drive source is transmitted via the deceleration mechanism such as the deceleration gear mechanism. Therefore, the disk transferring mechanism suffers a considerably heavy load ill comparison with the case where the pickup moving mechanism is driven.

Consequently, in the case where the stepping motor is used as the drive source for the pickup moving mechanism in order to achieve a high speed of the movement of the pickup, there arises a problem of a difficulty in reducing the number of motors used in the disk drive by means of a single motor (i.e., a single stepping motor) commonly serving as both of the drive source for the disk transferring mechanism and the drive source for the pickup moving mechanism, as described above. That is to say, when the stepping motor is driven in the state in which a motor power transmitting path is switched from the side of the pickup moving mechanism to the side of the disk transferring mechanism, a heavy load is exerted at the beginning of the drive and at a low engine speed, and therefore, it becomes difficult to stably perform a smooth control.

In view of the characteristics of the drive of the stepping motor, such a problem is inevitable not only in the case of the pickup moving mechanism and the disk transferring mechanism in the disk drive but also in various other cases where the stepping motor is commonly used as the drive source so that operation of a relatively light load and operation of a relatively heavy load are selectively performed by switching the power transmitting path.

SUMMARY OF THE INVENTION

The present invention has been accomplished in an attempt to solve the above problems observed in the prior art. An object of the present invention is to provide a power transmitting device, in which in the case where a single stepping motor is commonly used as both of a drive source for operation at a relatively light load and a drive source for operation at a relatively heavy load and the operations at a light load and a heavy load are selectively performed by switching a motor power transmitting path, a smooth control can be stably achieved even when a motor is driven in the state in which a power transmitting path is switched onto the side of the heavy load. Furthermore, another object of the present invention is to provide a disk drive provided with the above-described power transmitting device.

In view of this, a power transmitting device for a stepping motor according to a first aspect of the present invention comprises: a first operating unit of a relatively light load, to which power of a stepping motor is transmitted; a second operating unit of a relatively heavy load, to which the power of the stepping motor is transmitted via predetermined transmitting mechanism having a group of gears; switching mechanism having a claw member for switching a path for transmitting the power from the stepping motor between a first path, via which the power is transmitted to the first operating unit, and a second path, via which the power is transmitted to the second operating unit; and transmission prohibiting mechanism having a planetary gear for prohibiting the transmission of the power from the stepping motor to the second operating unit at the beginning of the power transmission via the second path.

In this case, the above-described transmission prohibiting mechanism can prohibit the power transmission at the beginning of the power transmission via the second path, via which the power of the stepping motor is to be transmitted to the second operating unit of a relatively heavy load. The engine speed of the stepping motor is increased during the prohibition of the power transmission, so that it is possible to avoid the exertion of a heavy load at the beginning of the drive of the motor and at a low engine speed. Consequently, even if the heavy load is exerted, it is possible to stably perform a smooth control of the start of the stepping motor.

In the first aspect of the present invention, it is preferable that the transmission prohibiting mechanism should be provided in the predetermined transmitting mechanism for transmitting the power of the stepping motor to the second operating unit.

In this case, the structure of the power transmitting device can be simplified in comparison with the case where the transmission prohibiting mechanism is provided independently of the predetermined transmitting mechanism.

Furthermore, with the above-described configuration, it is preferable that the predetermined transmitting mechanism should include an output gear connected to an output shaft of the stepping motor, an input gear connected to the second operating unit, and a planetary gear which is located between the output gear and the input gear and is driven by the output gear, to be thus moved on a predetermined trail; and the power transmission from the stepping motor to the second operating unit should be prohibited until the planetary gear is moved to a predetermined position to then mesh with the input gear.

In this case, the power of the stepping motor cannot be transmitted to the second operating unit until the planetary gear, which is interposed between the output gear connected to the output shaft of the stepping motor and the input gear connected to the second operating unit and moves on the predetermined trail, is moved to the predetermined position, at which the planetary gear meshes with the input gear. In other words, only such a very light load as to move the planetary gear along the predetermined trail is exerted on the stepping motor until the planetary gear is moved to the predetermined position at the beginning of the drive of the stepping motor, thereby avoiding the exertion of the heavy load at a low engine speed. Consequently, even if the heavy load is exerted, it is possible to stably perform a smooth control of the start of the stepping motor.

Furthermore, with the above-described configuration, it is preferable that a drive shaft provided with a spiral groove engageable with an engaging piece in the first operating unit should be connected to the output shaft of the stepping motor; a disengaging portion should be provided for disengaging the drive shaft from the engaging piece between the spiral groove and the output shaft of the stepping motor; and a first claw member should be additionally provided at a vicinity of the planetary gear, for locking the planetary gear at an initial position, at which the planetary gear does not mesh with the input gear, during the engagement of the engaging piece with the spiral groove while for unlocking the planetary gear upon disengaging the engaging piece from the spiral groove.

In this case, the locking state (i.e., locking or unlocking) by the first claw member of the planetary gear is switched according to the engagement state between the spiral groove in the drive shaft and the engaging piece of the first operating unit (in other words, whether the spiral groove and the engaging piece engage with or disengage from each other), that is, according to whether or not the first path, via which the power of the stepping motor is to be transmitted to the first operating unit, is in a power transmitting state. As a result, the power transmitting path from the stepping motor is alternatively switched between the first path and the second path. In this case, the planetary gear is locked at the initial position, at which the planetary gear does not mesh with the input gear, by the first claw member during the engagement of the engaging piece of the first operating unit with the spiral groove in the drive shaft, so that the power can be securely transmitted to the first operating unit via the first path.

Moreover, with the above-described configuration, it is preferable that a second claw member is further provided for locking the planetary gear, which has been moved to the predetermined position, at the predetermined position.

In this case, the planetary gear, which has been moved to the predetermined position and has meshed with the input gear of the second operating unit, is locked at the predetermined position by the second claw member, so that the power can be securely transmitted to the second operating unit via the second path.

Moreover, with the above-described configuration, it is preferable that the drive shaft in the first operating unit is connected substantially integrally to the output shaft of the stepping motor.

In this case, power of the stepping motor is transmitted substantially directly to the first operating unit of a relatively light load. Therefore, higher efficiency in power transmission is achieved in the first path, and also, the structure of the power transmitting device can be more simplified.

Moreover, with the above-described configuration, the drive shaft in the first operating unit may be connected to the output shaft of the stepping motor via a gear set.

In this case, higher flexibility can be obtained in the layout of the drive shaft in the first operating unit and the output shaft of the stepping motor.

A disk drive according to a second aspect of the present invention including a turn table for turnably supporting a disk, a pickup for writing an formation signal in the disk and/or reading the information signal recorded in the disk, a pickup moving mechanism for moving the pickup between the inner circumference and outer periphery of the disk in a reciprocating manner, and a disk transferring mechanism for transferring the disk between a loading position above the turn table and an ejection position outside of the device in a reciprocating manner, comprises: a stepping motor commonly serving as a power source for the pickup moving mechanism of a relatively light load and a power source for the disk transferring mechanism of a relatively heavy load; switching mechanism having a claw member for switching a path for transmitting the power from the stepping motor between a first path, via which the power is transmitted to the pickup moving mechanism, and a second path, via which the power is transmitted to the disk transferring mechanism via predetermined transmitting mechanism having a group of gears; and transmission prohibiting mechanism having a planetary gear for prohibiting the transmission of the power from the stepping motor to the disk transferring mechanism at the beginning of the power transmission via the second path.

In this case, the above-described transmission prohibiting mechanism can prohibit the power transmission at the beginning of the power transmission via the second path, via which the power of the stepping motor is to be transmitted to the disk transferring mechanism of a relatively heavy load. The engine speed of the stepping motor is increased during the prohibition of the power transmission, so that it is possible to avoid the exertion of a heavy load at the beginning of the drive of the motor and at a low engine speed. Consequently, even if the heavy load is exerted, it is possible to stably perform a smooth control of the start of the stepping motor.

In the second aspect of the present invention, it is preferable that the transmission prohibiting mechanism should be provided in the predetermined transmitting mechanism for transmitting the power of the stepping motor to the disk transferring mechanism.

In this case, the structure of the disk drive can be simplified by simplifying the power transmitting mechanism in comparison with the case where the transmission prohibiting mechanism is provided independently of the predetermined transmitting mechanism.

Furthermore, with the above-described configuration, it is preferable that the predetermined transmitting mechanism should include an output gear connected to an output shaft of the stepping motor, an input gear connected to the disk transferring mechanism, and a planetary gear, which is located between the output gear and the input gear and is driven by the output gear, to be thus moved on a predetermined trail; and the power transmission from the stepping motor to the disk transferring mechanism should be prohibited until the planetary gear is moved to a predetermined position to then mesh with the input gear.

In this case, the power of the stepping motor cannot be transmitted to the disk transferring mechanism until the planetary gear, which is interposed between the output gear connected to the output shaft of the stepping motor and the input gear connected to the disk transferring mechanism and moves on the predetermined trail, is moved to the predetermined position, at which the planetary gear meshes with the input gear. In other words, only such a very light load as to move the planetary gear along the predetermined trail is exerted on the stepping motor until the planetary gear is moved to the predetermined position at the beginning of the drive of the stepping motor, thereby avoiding the exertion of the heavy load at a low engine speed. Consequently, even if the heavy load is exerted, it is possible to stably perform a smooth control of the start of the stepping motor Moreover, with the above-described configuration, it is preferable that a drive shaft provided with a spiral groove engageable with an engaging piece of the pickup moving mechanism should be connected to the output shaft of the stepping motor; a disengaging portion should be provided for disengaging the drive shaft from the engaging piece between the spiral groove and the output shaft of the stepping motor; and a first claw member should be additionally provided at a vicinity of the planetary gear, for locking the planetary gear at an initial position, at which the planetary gear does not mesh with the input gear, during the engagement of the engaging piece with the spiral groove while for unlocking the planetary gear upon disengaging the engaging piece from the spiral groove.

In this case, the locking state (i.e., locking or unlocking) by the first claw member of the planetary gear is switched according to the engagement state between the spiral groove in the drive shaft and the engaging piece of the pickup moving mechanism (in other words, whether the spiral groove and the engaging piece engage with or disengage from each other), that is, according to whether or not the first path, via which the power of the stepping motor is to be transmitted to the pickup moving mechanism is in a power transmitting state. As a result, the power transmitting path from the stepping motor is alternatively switched between the first path and the second path. In this case, the planetary gear is locked at the initial position, at which the planetary gear does not mesh with the input gear, by the first claw member during the engagement of the engaging piece of the first operating unit with the spiral groove in the drive shaft, so that the power can be securely transmitted to the pickup moving mechanism via the first path.

Moreover, with the above-described configuration, it is preferable that a second claw member is further provided for locking the planetary gear, which has been moved to the predetermined position, at the predetermined position.

In this case, the planetary gear, which has been moved to the predetermined position and has meshed with the input gear of the disk transferring mechanism, is locked at the predetermined position by the second claw member, so that the power can be securely transmitted to the disk transferring mechanism via the second path.

Moreover, with the above-described configuration, it is preferable that the drive shaft in the first operating unit is connected substantially integrally to the output shaft of the stepping motor.

In this case, power of the stepping motor is transmitted substantially directly to the first operating unit of a relatively light load. Therefore, higher efficiency in power transmission is achieved in the first path, and also, the structure of the power transmitting device can be more simplified.

Moreover, with the above-described configuration, the drive shaft in the first operating unit may be connected to the output shaft of the stepping motor via a gear set.

In this case, higher flexibility can be obtained in the layout of the drive shaft in the first operating unit and the output shaft of the stepping motor.

Additionally, with the above-described configuration, it is preferable that the stepping motor should be disposed on the inner circumferential side of the disk.

In this case, since the stepping motor is disposed on the side of the disk inner circumference, it is possible to avoid the projection outward of the disk drive, and further, to favorably maintain the weight balance of the disk drive in comparison with the case where the stepping motor is disposed on the side of the disk outer periphery.

DETAILED DESCRIPTION OF THE PREFERRED EMBODIMENTS

Figure 1:
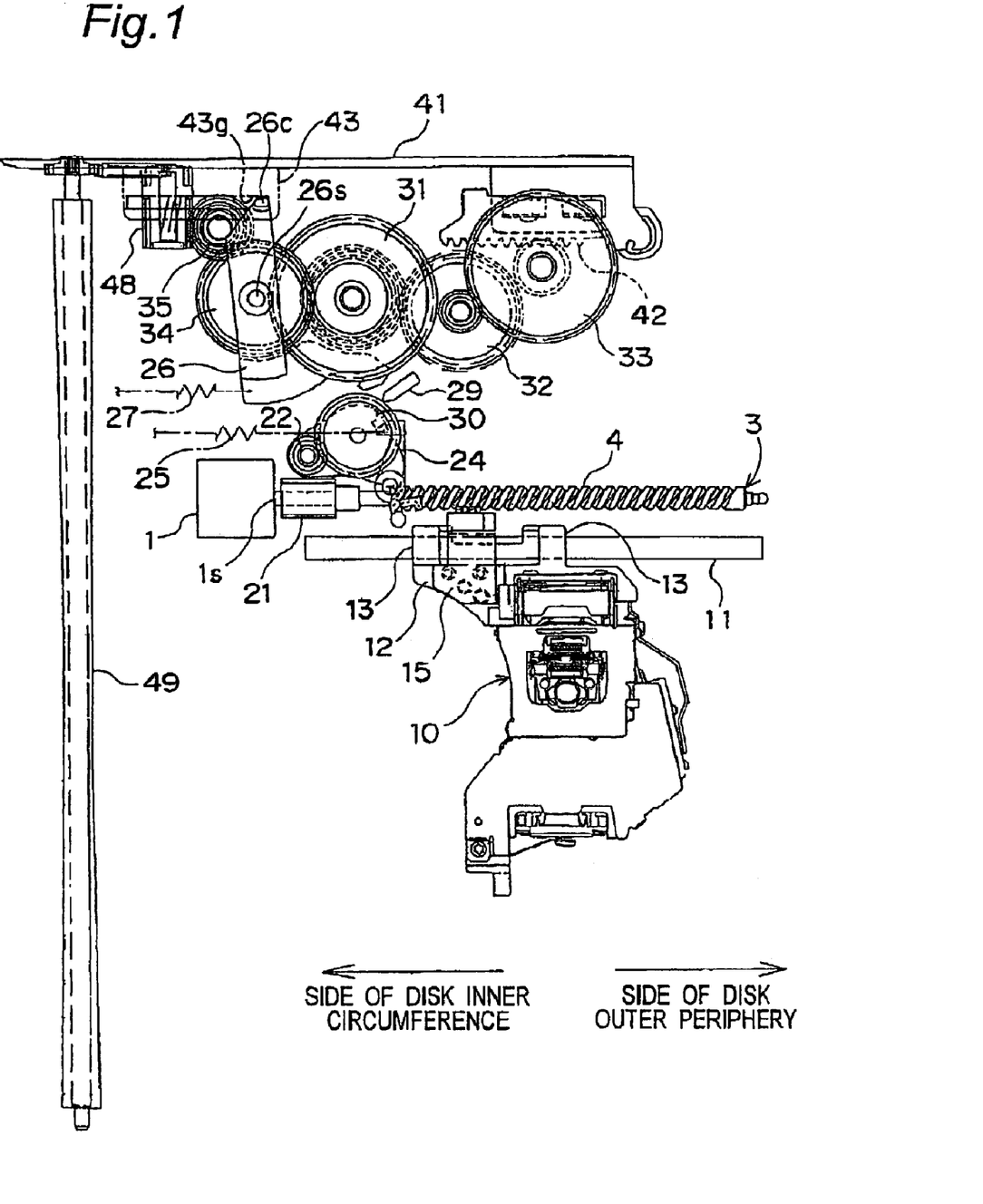
FIG. 1 is a plan view illustrating essential parts of a disk drive in the state in which a pickup can be moved in a preferred embodiment according to the present invention.
Figure 2:
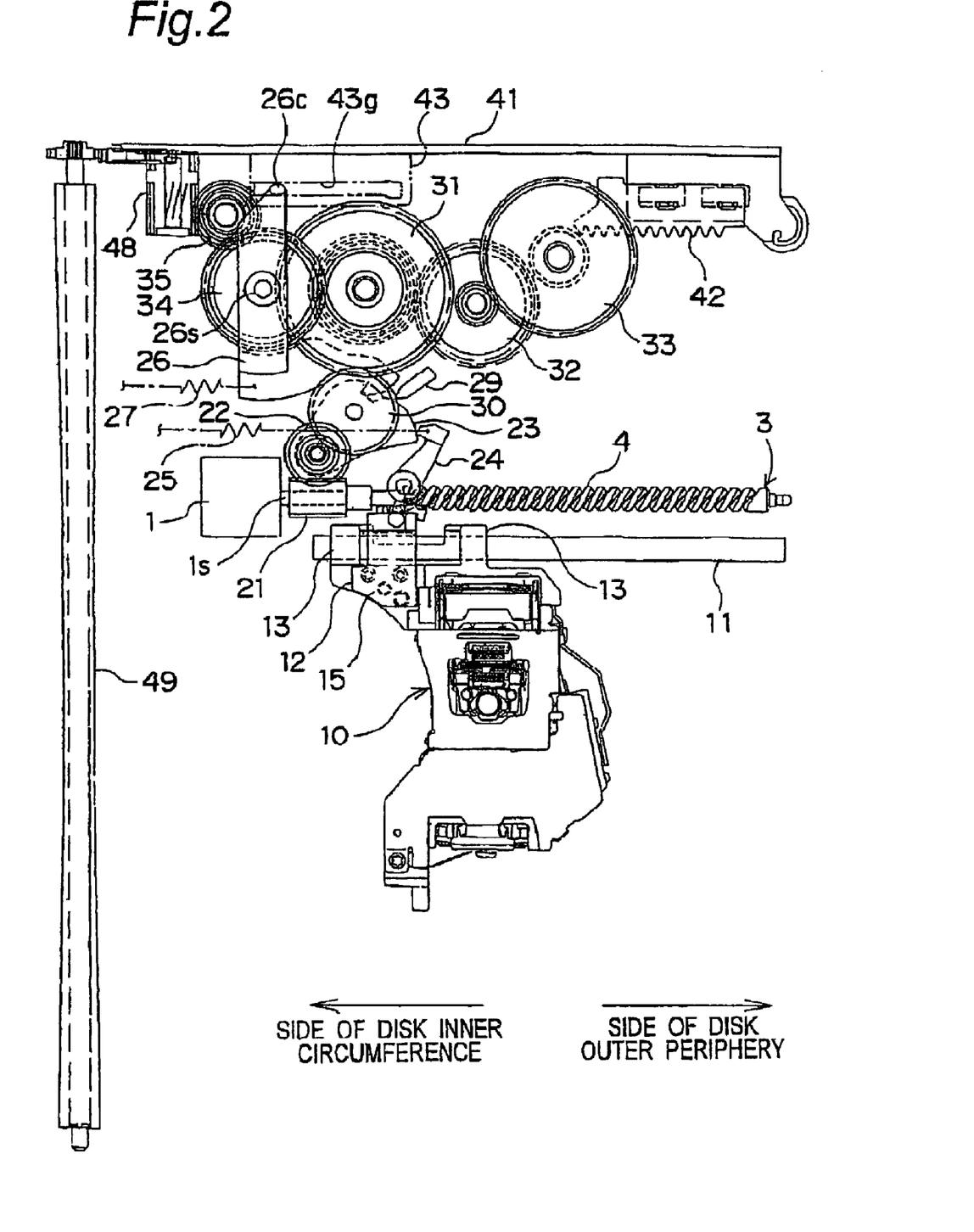
FIG. 2 is a plan view illustrating essential parts of the disk drive in the state in which a disk can be transferred.
Figure 3:
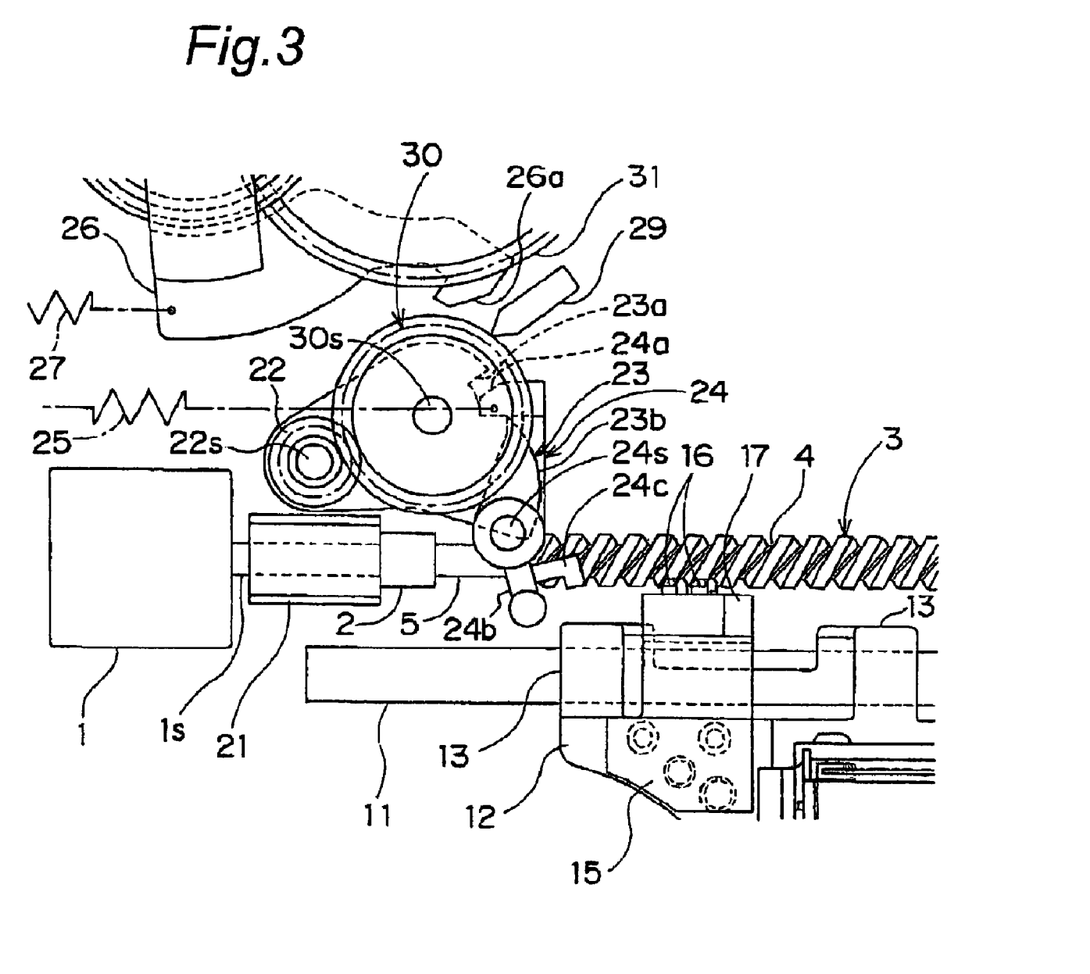
FIG. 3 is a plan view illustrating further essential parts in FIG. 1.
Figure 4:
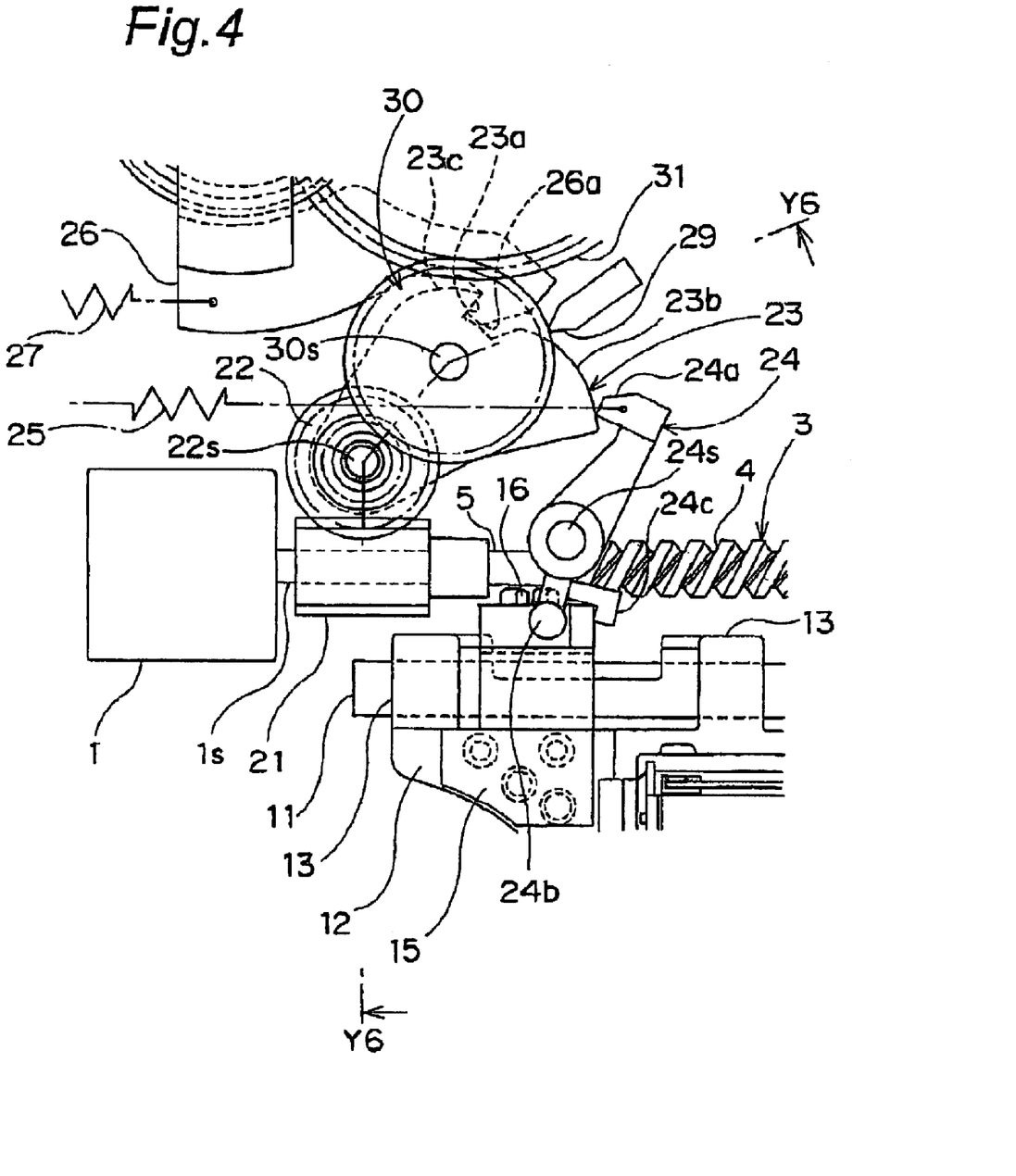
FIG. 4 is a plan view illustrating further essential parts in FIG. 2.

A description will be given below of preferred embodiments according to the present invention in reference to the accompanying drawings. FIG. 1 is a plan view illustrating essential parts of an optical disk drive provided with a power transmitting device for a stepping motor according to a present preferred embodiment in the state in which a pickup can be moved (in other words, in a so-called play state in which an optical disk is reproduced or recorded); FIG. 2 is a plan view illustrating essential parts of the optical disk drive in the state in which a disk can be transferred (in other words, in the state in which a disk can be loaded or ejected); and FIGS. 3 and 4 are plan views illustrating further essential parts in FIGS. 1 and 2, respectively.

As illustrated in FIGS. 1 to 4, the optical disk drive in the present preferred embodiment mounts thereon a stepping motor 1 serving as a motor for common use as a power source for a pickup moving mechanism of a relatively light load and a power source for a disk transferring mechanism of a relatively heavy load. Although not specifically illustrated, the stepping motor 1 is mounted on a part base (i.e., a so-called traverse base), which should be preferably supported in such a manner as to freely float vertically and laterally within a predetermined range with respect to a chassis constituting a device body.

In the present preferred embodiment, the stepping motor 1 is disposed on the side of a disk inner circumference. The adoption of such a layout can eliminate any possibility of projection of the stepping motor outward of the disk drive, unlike the case where a motor is disposed on the side of a disk outer periphery, and further, allows the weight balance of the disk drive to be favorably maintained. In particular, when the part base is supported in such a manner as to freely float with respect to the chassis, the part base can be supported in good balance.

A drive shaft 3 is disposed coaxially with the output shaft 1s of the stepping motor 1. One end of the drive shaft 3 is coupled with the terminal of the motor output shaft 1s via a coupling 2. The above-described motor output shaft is and drive shaft 3 extend in parallel to a guide rod 11 for guiding an optical pickup 10 between the inner circumference and outer periphery of a disk (not shown), that is, in a disk radial direction.

At one end of the pickup 10 for writing an information signal in the disk (not shown), or reading the information signal recorded in the disk is integrally fixed a guide base 12 provided with a pair of guide inserting portions 13 for allowing the guide rod 11 to be slidably inserted thereinto, as is well understood in reference to FIGS. 3 and 4. Furthermore, to the guide base 12 is fixed an engaging base 15 including, for example, a pair of engaging projections 16 and an engaging wall 17.

It is to be noted that a moving mechanism for the pickup 10 and the engaging projection 16 correspond to "a first operating unit" and "an engaging piece", respectively, as claimed in claims according to the present invention.

In the meantime, in the drive shaft 3, there is formed a spiral groove 4 engageable with the engaging projection 16. Between the spiral groove 4 and the output shaft Is of the stepping motor 1 is provided a relief portion 5 serving as "a disengaging portion" for releasing the engagement between the drive shaft 3 and the engaging projection 16.

As shown in FIGS. 1 and 3, while the engaging projection 16 engages with the spiral groove 4, by driving the stepping motor 1, so that the engaging projection 16 is driven in an axial direction in cooperation with the spiral groove 4 according to the rotation of the drive shaft 3 (i.e., the spiral groove 4) together with the rotation of the motor output shaft 1s, and thus, the pickup 10 is moved along the guide rod 11.

As described above, in this case, the power of the stepping motor 1 is transmitted to the engaging projection 16 of the pickup 10 from the output shaft 1s via the spiral groove 4 of the drive shaft 3. This transmitting path constitutes "a first path" as claimed in claims according to the present invention.

The moving mechanism for the pickup 10 merely allows the pickup 10 to be slidably moved along the guide rod 11 (wherein the guide inserting portion 13 serves as a sliding portion), and therefore, a load exerted on the stepping motor 1 is relatively light.

The moving direction of the pickup 10 is switched between a disk inner circumferential direction (i.e., leftward in FIGS. 1 to 4) and a disk outer peripheral direction (i.e., rightward in FIGS. 1 to 4) by switching the rotating direction of the stepping motor 1. In this manner, the pickup 10 is moved between the disk inner circumference and the disk outer periphery in a freely reciprocating manner. Incidentally, although the moving mechanism for the pickup 10 per se is similar to a conventionally known mechanism, the adoption of the stepping motor 1 as the drive source for the moving mechanism for the pickup 10 can achieve a fine movement control at a very high speed.

In the meantime, between a disk transferring mechanism and the stepping motor 1, there are interposed, as basic power transmitting elements, output gear 21 connected to the output shaft is of the stepping motor 1, an input gear 31 connected onto the side of the disk transferring mechanism and a planetary gear 30 interposed between both of the gears 21 and 31 and driven via the output gear 21 so as to be thus moved on a predetermined trail.

Figure 6:
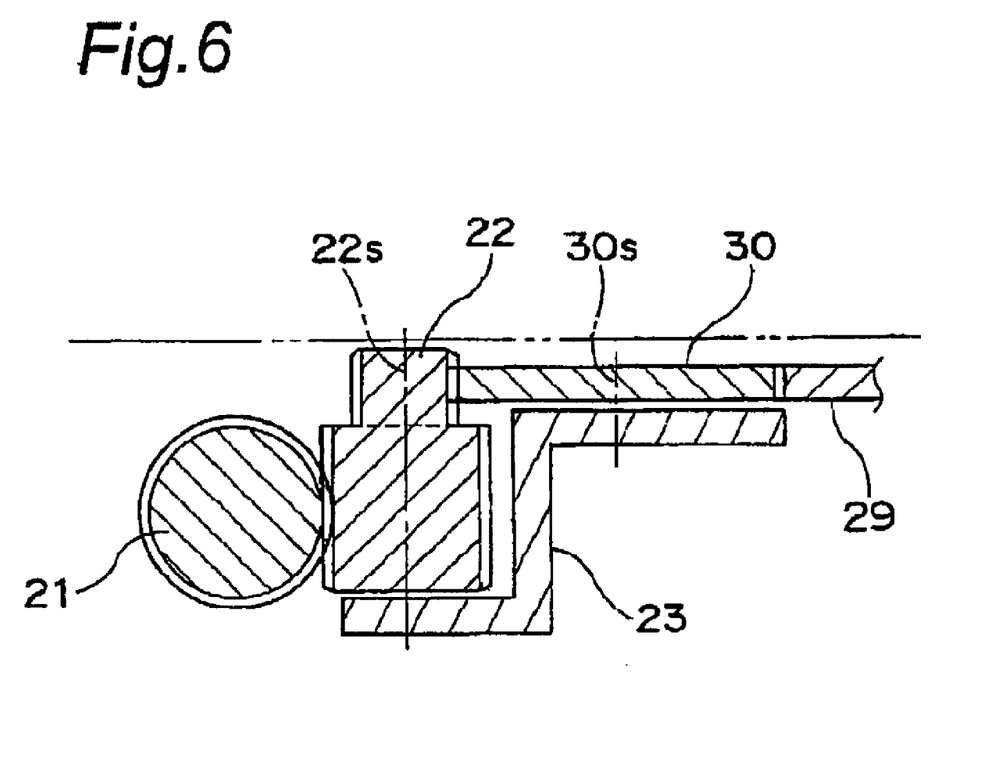
FIG. 6 is a partly cross-sectional explanatory view taken along a line Y6—Y6 of FIG. 4.

More detailed explanation will be made below. As shown in FIG. 6, the output gear 21 is constituted as a cylindrical worm gear. Between the output gear 21 and the planetary gear 30 is interposed an intermediate gear 22, which meshes with both of the gears 21 and 30. To this intermediate gear 22 is integrally fixed a gear plate 23, which can be turned on the pivotal shaft 22s of the intermediate gear 22.

The above-described disk transferring mechanism is similar to a conventionally known mechanism, which controls, for example, the vertical movement of a disk roller 49 by slidably actuating a slider 41 slidably disposed with respect to a device chassis side plate (not shown). The disk transferring mechanism also controls, for example, the vertical movement of a damper or locks and unlocks a floating mechanism, although not specifically illustrated, and further, rotatably drives the disk roller 49 so as to load or unload/eject the disk, not shown. In the case where the disk transferring mechanism is driven, a load exerted on the stepping motor 1 becomes relatively heavy.

An outline will be given below of a disk loading operation performed by the above-described disk transferring mechanism. The disk loading operation consists of a series of operations: the disk roller 49 is first driven to be rotated by detecting the start of insertion of the disk into the disk drive by a sensor; while the disk is pinched and held by the roller 49, the disk is transferred just above a turn table (not shown); and then, the disk is loaded on and press-fitted to the turn table by utilizing the pressing force of a disk clamper (not shown), including the urging force of a spring or the like in a series of operations.

Furthermore, operations for unloading and ejecting the disk transferring mechanism consist of a series of operations: the disk loaded on the turn table is lifted up from the turn table against the pressing force of the disk clamper; the disk roller 49 is driven to be rotated so as to be transferred in a discharge direction while the disk is pinched and held; and then, the disk is ejected to the outside of the disk drive.

In the operation for driving to rotate the disk roller 49 out of the above-described operations performed by the disk transferring mechanism, the load is light while only the roller 49 is idly rotated, but when the disk is started to be grasped, the load is gradually increased. In particular, as soon as the disk is grasped up to a diametral portion of the disk, the load exerted on the stepping motor 1 becomes considerably heavy.

Moreover, a heaviest load is exerted on the stepping motor 1 at an initial stage, at which the disk transferring mechanism starts the unloading operation, that is, at a stage, at which the disk press-fitted onto the turn table supporting surface by the pressing force of the disk clamper is lifted upward in separation from the turn table supporting surface against the pressing force of the disk clamper.

A pivotal shaft 30s of the planetary gear 30 is supported by the gear plate 23. Consequently, when the output gear 21 is rotated according to the drive of the stepping motor 1, and thereby, the intermediate gear 22 is rotated, the gear plate 23 also is integrally turned on the pivotal shaft 22s, so that the planetary gear 30 is moved accordingly.

Figure 5:
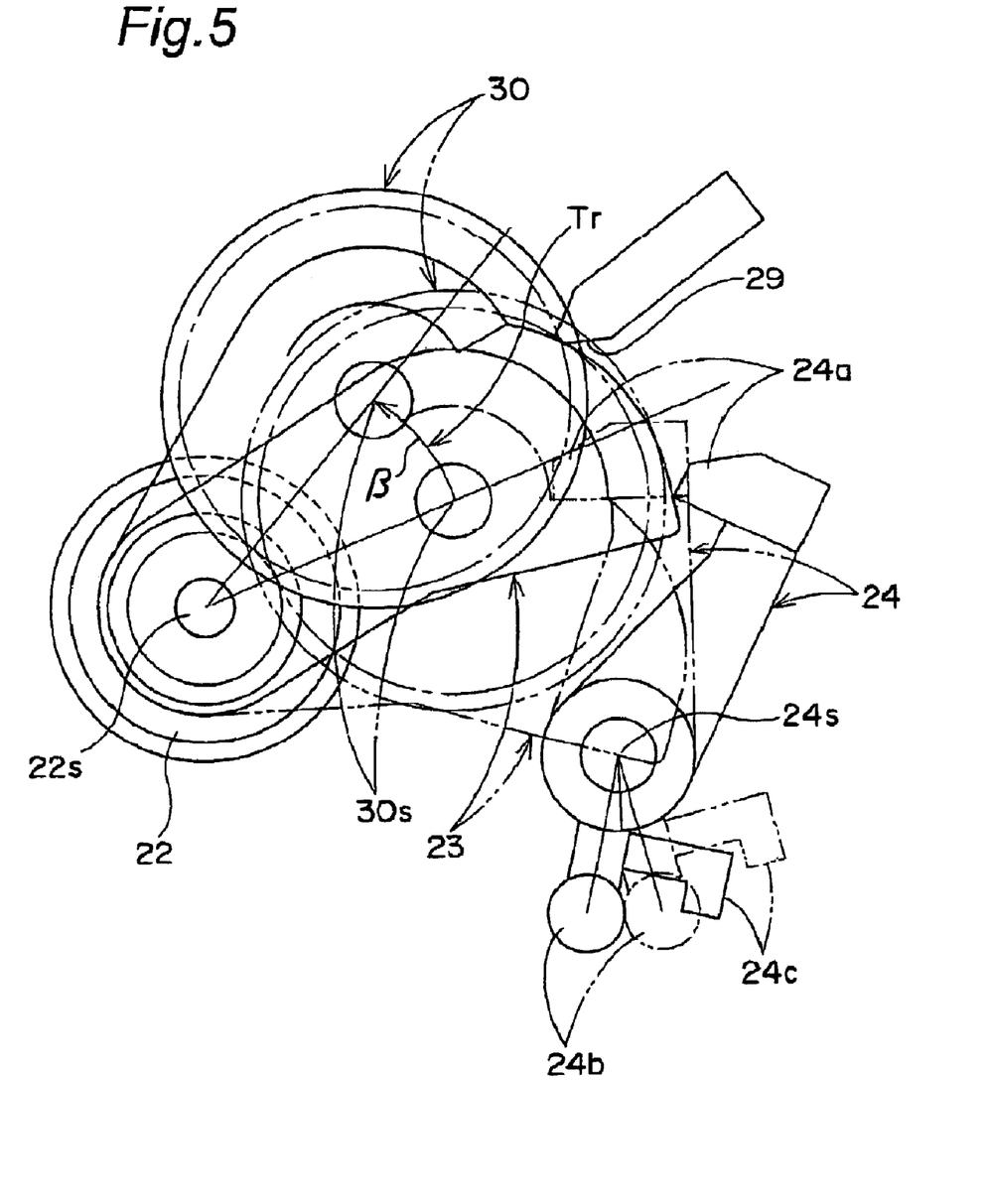
FIG. 5 is a plan view illustrating, in enlargement, a gear plate and a planetary gear in the disk drive.

As a part of teeth thereof are schematically shown, an inner tooth 29 having the same module as that of the planetary gear 30 is disposed in a predetermined range on the side of the outer periphery of the planetary gear 30. As particularly shown in FIG. 5, the planetary gear 30 is configured such that the planetary gear 30 is driven via the intermediate gear 22 in mesh with the inner tooth 29 when the planetary gear 30 is moved, so that the planetary gear 30 is moved along a predetermined trail Tr while a planetary motion is achieved between the intermediate gear 22 and the inner tooth 29.

The planetary gear 30 is additionally provided with a first claw member 24 for locking the planetary gear 30 at an initial position at which the planetary gear 30 does not mesh with the input gear 31 during the engagement of the engaging projection 16 of the pickup moving mechanism with the spiral groove 4 of the drive shaft 3 while unlocking the planetary gear 30 upon disengagement of the engaging projection 16 from the spiral groove 4. The first claw member 24 is specifically disposed in the vicinity of the outer periphery of the gear plate 23, and is turnably supported on the part base on its pivotal shaft 24s.

The first claw member 24 is urged toward the gear plate 23 (that is, counterclockwise in the drawing) by a tension spring 25 attached in the vicinity of its claw 24a. The claw 24a engages with a cutout 23a formed at the gear plate 23 during the engagement of the engaging projection 16 of the pickup moving mechanism with the spiral groove 4 of the drive shaft 3, as shown in FIGS. 1 and 3. Consequently, the gear plate 23 is locked, and therefore, the planetary gear 30 is locked at the initial position at which it does not mesh with the input gear 31. Incidentally, a cam face 23b for guiding the sliding motion of the claw 24a of the first claw member 24 is formed at a part of the outer periphery of the gear plate 23.

Thereafter, when the pickup 10 is moved up to a boundary within the movement range on the side of the disk inner circumference so that the engaging projection 16 reaches the relief portion 5 beyond the spiral groove 4, the engaging wall 17 formed at the engaging base 15 of the pickup 10 abuts and presses against a terminal 24b of the first claw member 24. As a consequence, the first claw member 24 is clockwise turned against the urging force of the tension spring 25, thereby releasing the locked state of the gear plate 23 (that is, the locked state of the planetary gear 30) by the first claw member 24. In other words, the gear plate 23 comes into a free state. In this state, a hook 24c disposed at the terminal of the first claw member 24 engages with the engaging wall 17, thus stably maintaining the unlocked state of the gear plate 23.

For example, in the case where a user performs the disk ejecting operation (i.e., depresses an ejection button), thereafter, when the output gear 21 is rotated according to the drive of the stepping motor 1, the intermediate gear 22 also is rotated accordingly, and thus, the gear plate 23 also is turned integrally. In accordance with this, the planetary gear 30 also is moved. Thereafter, when the gear plate 23 is turned by an angle β shown in FIG. 5, and then, reaches a predetermined position, the planetary gear 30 meshes with the input gear 31 in the disk transferring mechanism, as shown in FIGS. 2 and 4. Thus, the drive force of the stepping motor 1 is transmitted to the disk transferring mechanism.

In this state, the power of the stepping motor 1 is transmitted to the input gear 31 in the disk transferring mechanism from the output shaft 1s via the output gear 21, the intermediate gear 23 and the planetary gear 30. This transmitting path constitutes "a second path" as claimed in claims according to the present invention Furthermore, the disk transferring mechanism is equivalent to "a second operating unit" as claimed in claims according to the present invention; and the above-described output gear 21, intermediate gear 23, planetary gear 30 and input gear 31 are equivalent to "predetermined transmitting mechanism" as claimed in claims according to the present invention. Moreover, the first claw member 24 and the engaging wall 17 are equivalent to "switching mechanism" as claimed in claims according to the present invention.

In the state in which the power transmitting path for the stepping motor 1 is switched to the second path, via which the power is transmitted to the disk transferring mechanism, the power from the stepping motor 1 is transmitted to a rack 42 integrally attached to the slider 41 via a gear train consisting of the input gear 31 and the gears 32 and 33, so that the slider 41 is driven via the rack 42. Consequently, the above-described disk unloading operation is started. Here, the initial stage, at which the disk transferring mechanism starts the unloading operation, is a timing when the heaviest load is exerted on the stepping motor 1, as described already.

In the meantime, the power is transmitted to a drive gear 48 for driving the disk roller 49 from the input gear 31 via another gear train consisting of gears 34 and 35. The disk roller 49 is driven to be rotated by the drive gear 48, so that the disk (not shown), can be ejected. Incidentally, in the operation for driving to rotate the disk roller 49, the load is light during the idle rotation of only the roller 49, but the load is gradually increased when the disk is started to be grasped and held. In particular, when the disk is grasped up to its diametral portion, the load exerted on the stepping motor 1 becomes considerably heavy, as described already.

In the present preferred embodiment, even in the state in which the power transmitting path for the stepping motor 1 is switched to the second path, via which the power is transmitted to the disk transferring mechanism, the power cannot be transmitted onto the side of the disk transferring mechanism from the stepping motor 1 at the beginning stage until the planetary gear 30 is moved to the predetermined position to thus mesh with the input gear 31. In other words, the power transmission toward the disk transferring mechanism is prohibited.

That is to say, when the stepping motor 1 is driven in the state in which the power transmitting path for the stepping motor 1 is switched to the second path, the planetary motion is merely achieved between the intermediate gear 22 and the inner tooth 29 but the power cannot be transmitted at the beginning until the planetary gear 30 meshes with the input gear 31 of the disk transferring mechanism, wherein transmission prohibiting mechanism is constituted. Here, the inner tooth 29 may be provided in a region within at least a range from the initial position of the planetary gear 30 to a predetermined position at which the planetary gear 30 meshes with the input gear 31.

The transmission prohibiting mechanism is disposed in a power transmitting gear mechanism (that is, the predetermined transmitting mechanism) from the output gear 21 of the stepping motor 1 to the input gear 31 of the disk transferring mechanism. In comparison with the case where the transmission prohibiting mechanism is disposed independently of such transmitting mechanism, the power transmitting mechanism of the stepping motor 1 can be simplified, and further, the structure of the disk drive can be simplified.

In this manner, the power transmission is prohibited at the beginning of the power transmission via the second path, via which the power of the stepping motor 1 is to be transmitted to the disk transferring mechanism of a relatively heavy load, so that the engine speed of the stepping motor 1 is increased during the prohibition of the power transmission, thereby avoiding the exertion of the heavy load at a low engine speed at the berg of the drive of the motor. That is to say, the planetary gear 30 merely performs the planetary motion at the low engine speed and at a very light load, and therefore, there is little fear of a failure at the start of the stepping motor 1.

At the time when the planetary gear 30 finishes the planetary motion, and then, meshes with the input gear 31 of the disk transferring mechanism, the engine speed of the stepping motor 1 is increased up to such a high level that there is no fear of an inconvenience such as step out even with the exertion of a heavy load. Consequently, even in the case where the heavy load is exerted, a smooth control can be stably performed at the start of the stepping motor 1.

The locking state of the planetary gear 30 by the first claw member 24 (i.e., whether the planetary gear 30 is locked or unlocked) is switched according to the engaging state between the spiral groove 4 of the drive shaft 3 and the engaging projection 16 of the pickup moving mechanism (i.e., whether the spiral groove 4 and the engaging projection 16 engage with or disengage from each other), that is, according to whether or not the first path, via which the power of the stepping motor 1 is to be transmitted to the pickup moving mechanism, is in the power transmission state. As a result, the transmitting path for the power from the stepping motor 1 is alternatively switched between the first path and the second path. In this case, the planetary gear 30 is locked at the initial position, at which the planetary gear 30 does not mesh with the input gear 31 on the side of the disk transferring mechanism, by the first claw member 24 during the engagement of the engaging projection 16 of the pickup moving mechanism with the spiral groove 4 of the drive shaft 3, and therefore, the power can be securely transmitted to the pickup moving mechanism via the first path.

Furthermore, in the present preferred embodiment, the planetary gear 30 is additionally provided with a second claw member 26 for locking, at the predetermined position, the planetary gear 30, which meshes with the input gear 31 in the disk transferring mechanism after the planetary gear 30 is moved to the predetermined position along the predetermined trail Tr. The second claw member 26 is specifically disposed in the vicinity of the outer periphery of the gear plate 23 on a side opposite to the first claw member 24, and is turnably supported on the part base on its pivotal shaft 26s. Incidentally, although the pivotal shaft 26s is coaxial with that of the gear 34 in the present preferred embodiment, both of the pivotal shafts may be disposed at other positions different from each other.

The second claw member 26 is urged toward the gear plate 23 (that is, clockwise in the drawing) by a tension spring 27 attached in the vicinity of its claw 26a. The claw 26a engages with the cutout 23a formed at the gear plate 23 during the power transmission via the second path in mesh of the planetary gear 30 with the input gear 31 of the disk transferring mechanism, as shown in FIGS. 2 and 4. Consequently, the gear plate 23 is locked, and therefore, the planetary gear 30 is securely locked at the predetermined position at which the planetary gear 30 meshes with the input gear 31. Incidentally, a cam face 23c for guiding the sliding motion of the claw 26a of the second claw member 26 is formed at a part of the outer periphery of the gear plate 23.

In the meantime, a projection 26c is formed at the terminal of the second claw member 26. The projection 26c engages with a slot 43g formed in an engaging plate 43 disposed integrally with the slider 41. While the slider 41 is moved by the effect of the power transmission via the second path in mesh of the planetary gear 30 with the input gear 31 of the disk transferring mechanism, the projection 26c of the second claw member 26 is located on the way of the slot 43g, as shown in FIG. 2. In this state, the locked state of the gear plate 23 by the claw 26a is maintained.

And then, when the slider 41 is moved by a predetermined distance, the end wall of the slot 43g is brought into contact with and pressed against the projection 26c, as shown in FIG. 1. Consequently, the second claw member 26 is turned counterclockwise against the urging force of the tension spring 27, thereby releasing the locked state of the gear plate 23 by the second claw member 26 (that is, the locked state of the planetary gear 30)

In this manner, the planetary gear 30, which has been moved to the predetermined position to thus mesh with the input gear 31 of the disk transferring mechanism, is locked at the predetermined position by the second claw member 26, and therefore, the power can be securely transmitted to the disk transferring mechanism via the second path.

As described above, in the present preferred embodiment, in which the single stepping motor 1 is commonly used as the drive source for the operation of the relatively light load and the drive source for the operation of the relatively heavy load, in the case where the operations of the relatively light load and the relatively heavy load are selectively performed by switching the transmitting path for the motor power, the smooth control can be stably achieved even when the motor 1 is driven in the state in which the power transmitting path is switched onto the side of the heavy load.

Here, when the power transmitting path for the stepping motor 1 is switched from the second path, via which the power is transmitted to the disk transferring mechanism, to the first path, via which the power is transmitted to the pickup moving mechanism, the constituent elements of the disk drive perform an operation reverse to the above-described operation.

That is to say, in the state in which the constituent elements are located as shown in FIG. 2 when no disk is loaded in the disk drive, as soon as the disk is inserted into the disk drive, the sensor detects the start of the insertion, so that the stepping motor 1 is driven to be rotated in response to the detection signal. This rotating direction is reverse to that when the disk is unloaded and ejected.

The drive force of the stepping motor 1 is transmitted to the disk transferring mechanism via the second path, and thus, the above-described disk loading operation is performed. In other words, the disk roller 49 is driven to be rotated in a direction reverse to the direction at the time of the unloading and ejecting operations, and thus, the disk is transferred by the roller 49 just above the turn table (not shown), while the disk is pinched and held. The sliding operation of the slider 41 actuates the disk damper (not shown), also by utilizing the urging force of the spring or the like, so that the disk is loaded on and press-fitted to the turn table by the use of the pressing force.

At the final stage of the above-described disk loading operation, when the slider 41 is moved by the predetermined distance, the end wall of the slot 43g is brought into contact with and pressed against the projection 26c, as shown in FIG. 1. Consequently, the second claw member 26 is turned counterclockwise against the urging force of the tension spring 27, thereby releasing the locked state of the gear plate 23 by the second claw member 26 (that is, the locked state of the planetary gear 30). Thus, the gear plate 23 comes into a free state. That is to say, the transmission of the power of the stepping motor 1 via the second path comes to an end.

Thereafter, when the output gear 21 is further rotated according to the rotation of the stepping motor 1, the gear plate 23 also is integrally turned via the intermediate gear 22. The planetary gear 30 also is moved accordingly. The moving direction is reverse to the direction after the unloading and ejecting operations are finished. Furthermore, when the gear plate 23 is turned by the angle β (i.e., in a direction reverse to the direction indicated by the arrow in FIG. 5), the planetary gear 30 reaches the initial position, also as shown in FIGS. 1 and 3, and then, the first claw member 24 is turned counterclockwise by the urging force of the tension spring 25, so that the gear plate 23 is locked.

According to the turning operation of the first claw member 24, the hook 24c at the terminal of the first claw member 24 is disengaged from the engaging wall 17 formed at the pickup engaging base 15, so that the engaging projection 16 engages with the spiral groove 4. Namely, the switching operation for switching the power transmitting path for the stepping motor 1 from the second path to the first path is completed, and thus, the pickup 10 can be moved toward the disk outer periphery.

Figure 7:
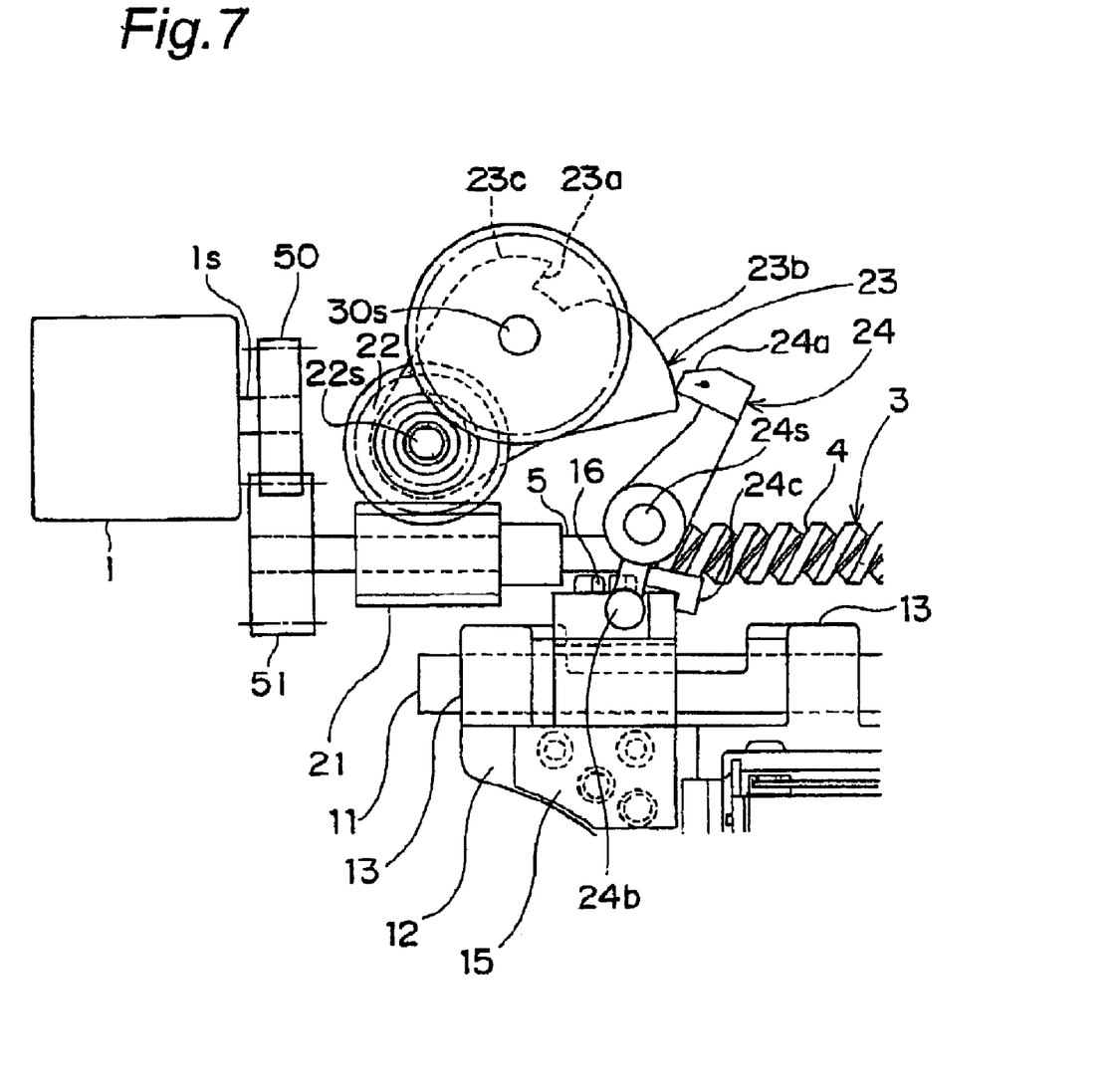
FIG. 7 is a plan view illustrating essential parts of the disk drive in the state in which a disk can be transferred in a modified embodiment according to the present invention.

Incidentally, although the description has been given of the case where the stepping motor is commonly used as the drive sources between the pickup moving mechanism and the disk transferring mechanism in the disk drive in the above-described preferred embodiment, the power transmitting device for the stepping motor according to the present invention is not limited to this. The present invention is effectively applicable also to various cases where the operation of the relatively light load and the operation of the relatively heavy load are selectively performed by switching the power transmitting path for the stepping motor In this manner, the present invention is not limited to the above-described preferred embodiment. For example, as shown in FIG. 7, a drive shaft 3 is not coaxial with an output shaft 1s of a stepping motor 1; an output gear 50 and an input gear 51 are disposed in the output shaft 1s of the stepping motor 1 and the drive shaft 3, respectively; and the output gear 50 is made to mesh with the input gear 51, thereby transmitting the rotation of the output shaft 1s of the stepping motor 1.

In this case, it is not required that the drive shaft 3 is to be coaxial with an output shaft 1s of a stepping motor 1. Accordingly, higher flexibility can be obtained in the layout of the drive shaft 3 in the pickup moving mechanism and the output shaft 1s of the stepping motor 1.

It is to be understood that various improvements can be added and the design can be variously changed without departing from the scope of the present invention.

In the power transmitting device for the stepping motor according to the present invention, the transmission prohibiting mechanism is provided for prohibiting the power transmission from the stepping motor to the second operating unit at the beginning of the power transmission via the second path, via which the power from the stepping motor is transmitted to the second operating unit of the relatively heavy load. Consequently, the power transmission can be prohibited at the beginning of the power transmission via the second path, via which the power from the stepping motor is to be transmitted to the second operating unit of the relatively heavy load. Since the engine speed of the stepping motor is increased during the prohibition of the power transmission, it is possible to avoid the heavy load from being exerted at the beginning of the motor drive and at the low engine speed. Thus, even if the heavy load is exerted, the smooth control can be stably achieved at the start of the stepping motor.

Furthermore, in the disk drive according to the present invention, the transmission prohibiting mechanism is provided for prohibiting the power transmission from the stepping motor to the disk transferring mechanism at the beginning of the power transmission via the second path, via which the power from the stepping motor is transmitted to the disk transferring mechanism of the relatively heavy load. Consequently, the power transmission can be prohibited at the beginning of the power transmission via the second path, via which the power from the stepping motor is to be transmitted to the disk transferring mechanism of the relatively heavy load. Since the engine speed of the stepping motor is increased during the prohibition of the power transmission, it is possible to avoid the heavy load from being exerted at the beginning of the motor drive and at the low engine speed. Thus, even if the heavy load is exerted, the smooth control can be stably achieved at the start of the stepping motor.

What is claimed is:

1. A power transmitting device for a stepping motor comprising:

a first operating unit of a relatively light load, to which power of a stepping motor is transmitted;

a second operating unit of a relatively heavy load, to which the power of the stepping motor is transmitted via predetermined transmitting mechanism;

switching mechanism for switching a path for transmitting the power from the stepping motor between a first path, via which the power is transmitted to the first operating unit, and a second path, via which the power is transmitted to the second operating unit; and transmission prohibiting mechanism for prohibiting the transmission of the power from the stepping motor to the second operating unit via the second path until speed of the stepping motor is increased to a predetermined level.

2. A power transmitting device for a stepping motor as claimed in claim 1, wherein the transmission prohibiting mechanism is provided in the predetermined transmitting mechanism.

3. A power transmitting device for a stepping motor as claimed in claim 2, wherein the predetermined transmitting mechanism includes an output gear connected to an output shaft of the stepping motor, an input gear connected to the second operating unit, and a planetary gear which is located between the output gear and the input gear and is driven by the output gear, to be thus moved on a predetermined trail; and the power transmission from the stepping motor to the second operating unit is prohibited until the planetary gear is moved to a predetermined position to then mesh with the input gear.

4. A power transmitting device for a stepping motor as claimed in claim 3, wherein a drive shaft provided with a spiral groove engageable with an engaging piece in the first operating unit is connected to the output shaft of the stepping motor;
a disengaging portion is provided for disengaging the drive shaft from the engaging piece between the spiral groove and the output shaft of the stepping motor; and
a first claw member is additionally provided, for locking the planetary gear at an initial position, at which the planetary gear does not mesh with the input gear, during the engagement of the engaging piece with the spiral groove while for unlocking the planetary gear upon disengaging the engaging piece from the spiral groove.

5. A power transmitting device for a stepping motor as claimed in claim 4, wherein a second claw member is further provided for locking the planetary gear, which has been moved to the predetermined position.

6. A power transmitting device for a stepping motor as claimed in claim 4, wherein the drive shaft in the first operating unit is connected substantially integrally to the output shaft of the stepping motor.

7. A power transmitting device for a stepping motor as claimed in claim 4, wherein the drive shaft in the first operating unit is connected to the output shaft of the stepping motor via a gear set.

8. A disk drive including a turn table for turnably supporting a disk, a pickup for writing an information signal in the disk and/or reading the information signal recorded in the disk, a pickup moving mechanism for moving the pickup between the inner circumference and outer periphery of the disk in a reciprocating manner, and a disk transferring mechanism for transferring the disk between a loading position above the turn table and an ejection position outside of the device in a reciprocating manner, the disk drive comprising:
a stepping motor commonly serving as a power source for the pickup moving mechanism of a relatively light load and a power source for the disk transferring mechanism of a relatively heavy load;
switching mechanism for switching a path for transmitting the power from the stepping motor between a first path, via which the power is transmitted to the pickup moving mechanism, and a second path, via which the power is transmitted to the disk transferring mechanism via predetermined transmitting mechanism; and transmission prohibiting mechanism for prohibiting the transmission of the power from the stepping motor to the disk transferring mechanism via the second path until speed of the stepping motor is increased to a predetermined level.

9. A disk drive as claimed in claim 8, wherein the transmission prohibiting mechanism is provided in the predetermined transmitting mechanism.

10. A disk drive as claimed in claim 9, wherein the predetermined transmitting mechanism includes an output gear connected to an output shaft of the stepping motor, an input gear connected to the disk transferring mechanism, and a planetary gear, which is located between the output gear and the input gear and is driven by the output gear, to be thus moved on a predetermined trail; and the power transmission from the stepping motor to the disk transferring mechanism is prohibited until the planetary gear is moved to a predetermined position to then mesh with the input gear.

11. A disk drive as claimed in claim 10, wherein a drive shaft provided with a spiral groove engageable with an engaging piece of the pickup moving mechanism is connected to the output shaft of the stepping motor;
a disengaging portion is provided for disengaging the drive shaft from the engaging piece between the spiral groove and the output shaft of the stepping motor; and
a first claw member is additionally provided, for locking the planetary gear at an initial position, at which the planetary gear does not mesh with the input gear, during the engagement of the engaging piece with the spiral groove while for unlocking the planetary gear upon disengaging the engaging piece from the spiral groove.

12. A disk drive as claimed in claim 11, wherein a second claw member is further provided for locking the planetary gear, which has been moved to the predetermined position.

13. A disk drive for a stepping motor as claimed in claim 11, wherein the drive shaft in the first operating unit is connected substantially integrally to the output shaft of the stepping motor.

14. A disk drive for a stepping motor as claimed in claim 11, wherein the drive shaft in the first operating unit is connected to the output shaft of the stepping motor via a gear set.

15. A disk drive as claimed in claim 8, wherein the stepping motor is disposed on the inner circumferential side of the disk.

16. A disk drive as claimed in claim 9, wherein the stepping motor is disposed on the inner circumferential side of the disk.

17. A disk drive as claimed in claim 10, wherein the stepping motor is disposed on the inner circumferential side of the disk.

18. A disk drive as claimed in claim 11, wherein the stepping motor is disposed on the inner circumferential side of the disk.

19. A disk drive as claimed in claim 12, wherein the stepping motor is disposed on the inner circumferential side of the disk.

20. A disk drive as claimed in claim 13, wherein the stepping motor is disposed on the inner circumferential side of the disk.

21. A disk drive as claimed in claim 14, wherein the stepping motor is disposed on the inner circumferential side of the disk.

* * * * *